US009842274B2

(12) United States Patent
Rodriguez-Serrano et al.

(10) Patent No.: US 9,842,274 B2
(45) Date of Patent: Dec. 12, 2017

(54) EXTENDING DATA-DRIVEN DETECTION TO THE PREDICTION OF OBJECT PART LOCATIONS

(71) Applicant: Xerox Corporation, Norwalk, CT (US)

(72) Inventors: Jose-Antonio Rodriguez-Serrano, Grenoble (FR); Zhenwen Dai, Sheffield (GB)

(73) Assignee: Xerox Corporation, Norwalk, CT (US)

( * ) Notice: Subject to any disclaimer, the term of this patent is extended or adjusted under 35 U.S.C. 154(b) by 733 days.

(21) Appl. No.: 14/228,947

(22) Filed: Mar. 28, 2014

(65) Prior Publication Data

US 2015/0278632 A1 Oct. 1, 2015

(51) Int. Cl.
*G06K 9/62* (2006.01)
*G06K 9/52* (2006.01)
(Continued)

(52) U.S. Cl.
CPC ......... *G06K 9/52* (2013.01); *G06F 17/30247* (2013.01); *G06F 17/30259* (2013.01);
(Continued)

(58) Field of Classification Search
CPC ........... G06K 9/00201; G06K 9/00208; G06K 9/4676; G06K 9/468; G06K 9/62;
(Continued)

(56) References Cited

U.S. PATENT DOCUMENTS 5,845,048 A * 12/1998 Masumoto ........... G06K 9/6217
706/20
6,122,639 A 9/2000 Babu et al.
(Continued)

FOREIGN PATENT DOCUMENTS

EP 2701098 A2 2/2014

OTHER PUBLICATIONS

Sid Yingze Bao, Yu Xiang, and Silvio Savarese, "Object Co-Detection", Computer Vision ECCV (2012) Springer-Verlag Berlin Heidelberg, pp. 86-101.*
(Continued)

*Primary Examiner* — Eric Rush
(74) *Attorney, Agent, or Firm* — Kermit D. Lopez; Luis M. Ortiz; Ortiz & Lopez, PLLC (57) ABSTRACT

Methods and systems for detecting an object part location based on an extended date-driven detection. A specific relevance value between configurations of parts with respect to a set of training images annotated with annotating objects can be defined. A similarity learning algorithm can be applied with respect to the parts to obtain a similarity function based on the similarity between the part configurations. The similarity learning algorithm receives a set of positive pair having similar part configuration and a negative pair having different configuration and returns the similarity function that tends to assign a high score to new positive pairs and a low score to negative pairs. A similarity between a new image and the training images can be measured utilizing the learned similarity function to obtain a neighbor image and a visible and/or non-visible part location with respect to the image can be predicted based on the neighbor image.

15 Claims, 9 Drawing Sheets

(51) Int. Cl.
*G06F 17/30* (2006.01)
*G06K 9/00* (2006.01)
*G06K 9/32* (2006.01)
*G06K 9/46* (2006.01)

(52) U.S. Cl.
CPC ....... *G06K 9/00785* (2013.01); *G06K 9/3233* (2013.01); *G06K 9/468* (2013.01); *G06K 9/6202* (2013.01); *G06K 9/6211* (2013.01); *G06K 9/6215* (2013.01); *G06K 9/6256* (2013.01)

(58) Field of Classification Search
CPC .. G06K 9/6201; G06K 9/6202; G06K 9/6211; G06K 9/6253; G06K 9/6254; G06K 9/6255; G06K 9/6256; G06K 9/72; G06F 17/30244; G06F 17/30247; G06F 17/30256; G06F 17/30259
USPC ....... 382/100, 103, 155, 159, 181, 190, 195, 382/203, 209, 216–220, 224, 282, 305, 382/160
See application file for complete search history.

(56) References Cited

U.S. PATENT DOCUMENTS

| | | | | |
|---|---|---|---|---|
| 7,239,929 | B2* | 7/2007 | Ulrich | G06K 9/6255 |
| | | | | 345/420 |
| 8,103,085 | B1 | 1/2012 | Zadeh | |
| 8,111,873 | B2* | 2/2012 | Berthilsson | G06K 9/00771 |
| | | | | 382/103 |
| 8,311,281 | B2 | 11/2012 | Ikeda | |
| 8,374,423 | B2 | 2/2013 | Lee et al. | |
| 8,406,470 | B2 | 3/2013 | Jones et al. | |
| 8,467,570 | B2 | 6/2013 | Ma et al. | |
| 8,484,111 | B2 | 7/2013 | Frankland et al. | |
| 8,509,478 | B2 | 8/2013 | Haas et al. | |
| 8,620,875 | B2 | 12/2013 | Jagota | |
| 8,625,887 | B2* | 1/2014 | Li | G06K 9/6256 |
| | | | | 382/209 |
| 8,768,048 | B1* | 7/2014 | Kwatra | G06K 9/72 |
| | | | | 382/159 |
| 8,913,783 | B2* | 12/2014 | Khan | G06K 9/00651 |
| | | | | 382/103 |
| 9,098,741 | B1* | 8/2015 | Anguelov | G06K 9/00536 |
| 9,111,173 | B2* | 8/2015 | Ranganathan | G06K 9/4676 |
| 9,336,457 | B2* | 5/2016 | Raykar | G06K 9/6211 |
| 2002/0026339 | A1 | 2/2002 | Frankland et al. | |
| 2009/0092336 | A1* | 4/2009 | Tsurumi | G06K 9/6211 |
| | | | | 382/294 |
| 2012/0002868 | A1* | 1/2012 | Loui | G06K 9/00677 |
| | | | | 382/159 |
| 2012/0189193 | A1 | 7/2012 | Overett et al. | |
| 2012/0308124 | A1* | 12/2012 | Belhumeur | G06K 9/00281 |
| | | | | 382/159 |
| 2013/0182077 | A1 | 7/2013 | Holz | |
| 2013/0290222 | A1 | 10/2013 | Gordo et al. | |
| 2015/0023557 | A1* | 1/2015 | Yoo | G06K 9/6282 |
| | | | | 382/103 |
| 2016/0232678 | A1* | 8/2016 | Kurz | G06F 17/30247 |

OTHER PUBLICATIONS

Pedro F. Felzenszwalb and Daniel P. Huttenlocher, "Pictorial Structures for Object Recognition", International Journal of Computer Vision, 2005, pp. 55-79.*

Daniel Kuettel and Vittorio Ferrari, "Figure-ground segmentation by transferring window masks", IEEE, Conference on Computer Vision and Pattern Recognition, 2012, pp. 558-565.*

Roozbeh Mottaghi, Ananth Ranganathan, and Alan Yuille, "A Compositional Approach to Learning Part-based Models of Objects", IEEE, International Conference on Computer Vision Workshops, 2011, pp. 561-568.*

Dalal, N. et al., "Histograms of Oriented Gradients for Human Detection," IEEE Computer Society Conference on Computer Vision and Pattern Recognition Jun. 25, 2005, San Diego, CA, 8 pages.

Felzenszwalb, P. F. et al., "Object Detection with Discriminatively Trained Part Based Models," IEEE Transactions on Pattern Analysis and Machine Intelligence (2010) 32(9):1627-1645.

Rodriguez-Serrano, J. A. et al., "Predicting an Object Location using a Global Image Representation," ICCV 2013, Sydney, Australia, Dec. 3-6, 8 pages.

Russell, B. C. et al., "Object Recognition by Scene Alignment," Advances in Neural Information Processing Systems (2007) 8 pages.

Bao, S. Y. et al., "Object Co-detection," Computer Vision ECCV (2012) Springer, Berlin, pp. 86-101.

Grauman, K. et al., "Visual Object Recognition," Synthesis Lectures on Computer Vision #1, Jan. 27, 2011, 172 pages.

* cited by examiner

|  | PREDICTION OF VISIBLE PARTS ONLY (IDEALISTIC SETTING) | | | | | PREDICTION OF VISIBLE AND INVISIBLE PARTS (REALISTIC SETTING) | | | | |
| --- | --- | --- | --- | --- | --- | --- | --- | --- | --- | --- |
|  | AVERAGE | RIGHT | FRONT | LEFT | REAR | AVERAGE | RIGHT | FRONT | LEFT | REAR |
| GENERIC IMAGE SIMILARITY | 78 | 59.1 | 90.3 | 95.3 | 67.4 | 85.3 | 88.0 | 85.9 | 84.4 | 83 |
| INDIVIDUAL PART LEARNING | 93.6 | 95.6 | 94.9 | 97.3 | 86.5 | 79.1 | 84.7 | 73.7 | 76.5 | 81.5 |
| RIGHT PART MODEL | 83.3 | 95.6 | 86.8 | 81.0 | 69.5 | 83.5 | 84.7 | 83.8 | 84.8 | 80.6 |
| PROPOSED | 87.7 | 80.6 | 91.9 | 95.8 | 82.5 | 90.9 | 93.2 | 91.6 | 90.1 | 88.5 |

FIG. 9

EXTENDING DATA-DRIVEN DETECTION TO THE PREDICTION OF OBJECT PART LOCATIONS

FIELD OF THE INVENTION

Embodiments are generally related to field of object detection. Embodiments are also related to the field of image-processing. Embodiments are additionally related of the field of DDD (Data-Driven Detection) for object part location prediction.

BACKGROUND

Figure 1:
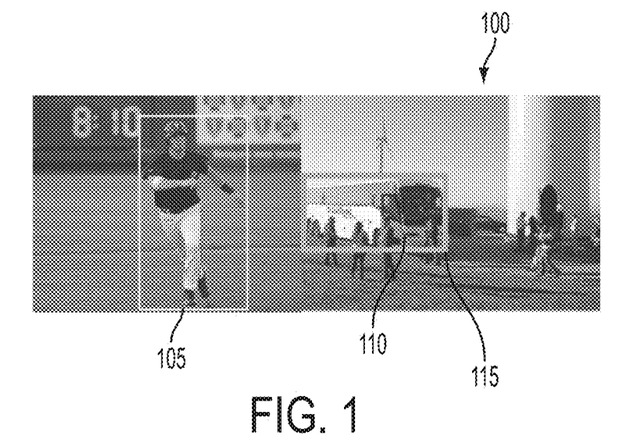
FIG. 1 illustrates an image of a person and a vehicle detected utilizing a prior art object detection approach.

Detecting objects is a fundamental step in many image-processing and computer vision applications. FIG. 1 illustrates an example of an image 100 containing objects of interest 105 (e.g., a person) and 110 (e.g., a vehicle) detected utilizing conventional object detection techniques. The prior art object detection approach illustrated in FIG. 1 involves receiving the image 100 containing the objects of interest 105 and 110 and generates an annotating object such as a bounding box 115 about the object location as a desired output. The task (i.e., object type/instance to locate) can be specified by a data training set, which can include data indicative of images annotated with locations of a relevant object in the form of the bounding box 115, which provides examples of desired input and output pairs.

Detecting particular portions or parts of the object permits further interpretation of the image because simply locating the object may not be sufficient for certain applications. For example, the location of specific body parts (e.g., head, torso, arms, etc.) can be detected to estimate a particular pose or to infer an action performed by a person. Similarly, different sides of the vehicle (e.g., front, rear, left right, license plate, wheels, etc.) can be detected to interpret position of the vehicle.

Figure 2:
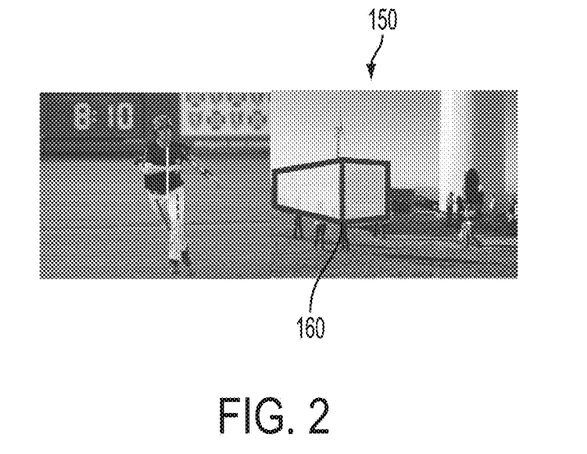
FIG. 2 illustrates an image of the person and the vehicle detected utilizing a prior art object part detection approach.

FIG. 2 illustrates an example of an image 150 of the object/person 105 and the object/vehicle 110 detected using another object part detection technique. The object part with respect to the image 150 can be determined utilizing a fixed set of bounding boxes 160 corresponding to different pre-defined parts. The detection of object parts in this fashion provides more detailed information and enables a deeper reasoning regarding a scene depicted in the image 150 than knowing the object location.

Data-driven detection (DDD) is another approach for detecting objects in an image by computing the similarity between the input image and all the images in an annotated training set. The location of the object can be predicted as a weighted average of the annotated object locations in first few neighbors. The similarity can be a standard similarity between images, or obtained with a similarity learning algorithm. The detection can be formulated as a query to a database and the similarities can be computed from a global image descriptor so that the prediction employs information from the whole image (i.e., parts of the image different from the object might be also employed as cues to predict the object). The obtained similarity between the images is not a generic similarity, but it is tailored to an end-task of detection when using a metric learning.

The problem associated with such DDD techniques is that the images are annotated with a single bounding box and does not take into account the global consistency between parts. Additionally, DDD is less efficient because a sliding window approach has to be run once for each part and a high-level consistency model is usually employed in order to ensure the feasibility of the part combinations. Furthermore, DDD is not accurate and contains inefficiencies because the DDD approach involves evaluation of a large set of sub-regions and does not leverage context because the classification is only based on information within the sub-region. Such methods for detecting parts of the objects are typically very costly.

Based on the foregoing, it is believed that a need exists for improved methods and systems for predicting an object part location based on extended data-driven detection, as will be described in greater detailed herein.

SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved object part detection.

It is another aspect of the disclosed embodiments to provide for improved methods and systems for predicting an object part location based on extended data-driven detection.

It is a further aspect of the disclosed embodiments to provide an improved similarity learning method and system for detecting multiple object part locations.

The aforementioned aspects and other objectives and advantages can now be achieved as described herein. Methods and systems are disclosed for detecting an object part location based on an extended data-driven detection is disclosed herein. A specific relevance value between configurations of parts with respect to a set of training images annotated with annotating objects such as, for example, a set of part bounding boxes can be defined. Note that the use of a bounding "box" is not a limitation of the disclosed embodiments, but is referred to herein for illustrative purposes only. It can be appreciated that other shapes (i.e., rectangles, circles, ovals, etc.) or objects (e.g., graphs, etc.) can be utilized in place of a bounding box.

A similarity learning algorithm can be applied with respect to the parts to obtain a similarity function based on the similarity between the part configurations. The similarity learning algorithm receives a set of positive pair having similar part configuration and a negative pair having different configuration and returns the similarity function that tends to assign a high score to new positive pairs and a low score to negative pairs. A similarity between a new image and the training images can be measured utilizing the learned similarity function to obtain a neighbor image and a visible and/or non-visible part location with respect to the image can be predicted based on the neighbor image. The data driven detection can be executed as a single query, independent of the number of parts by taking account global consistency between the parts.

The image with respect to the object can be captured by an image-capturing unit and can be processed utilizing an image-processing unit. The training set of images can be annotated with annotating objects (e.g., part bounding boxes) having a fixed number of parts. A bounding box can be, for example, a rectangle having at least four coordinates (top, bottom, left, right). It can be appreciated, however, that the annotating object is compatible with other paradigms for annotating the parts (not limited to a bounding box) such as polygons, pixel masks, graphs, etc. Any reference herein to rectangles is for illustrative purposes only.

The annotating object (e.g., a bounding box, polygon, pixel mask, graph, etc.) may include an empty value if the part is not visible in the image. A set of indices corresponding to the visible parts in the image can be defined. If different parts are visible in the image, then the relevance value is zero. If similar parts are visible, then a part-by-part overlap score can be computed by measuring an overlap between the parts such as, for example, an area intersection-to-union ratio. If the overlap function is greater than a threshold, then the relevance value is 1, otherwise 0. The threshold depends on the constraints with respect to the data driven detection application. The configurations are similar if the bounding boxes of all visible parts are similar and agree in location.

The prediction of object part locations can be determined by computing the similarity between the images using the learned similarity function and the nearest neighbor. A location (and visibilities) of parts can be outputted for a single neighbor and the parts can be combined in case of multiple neighbors. If the part is not visible for the majority of neighbours, then the output is an empty value. Otherwise, a weighted average for the visible parts can be computed. The locations of the object parts of the neighbouring images, which handle non-visible parts, can also be combined. The system obtains significantly higher accuracy and can be employed for images annotated with multiple bounding boxes that are not independent.

BRIEF DESCRIPTION OF THE FIGURES

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the present invention can be embodied as a method, data processing system, or computer program product. Accordingly, the present invention may take the form of an entire hardware embodiment, an entire software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, etc.

Computer program code for carrying out operations of the present invention may be written in an object oriented programming language (e.g., Java, C++, etc.). The computer program code, however, for carrying out operations of the present invention may also be written in conventional procedural programming languages such as the "C" programming language or in a visually oriented programming environment such as, for example, Visual Basic.

The program code may execute entirely on the user's computer, partly on the user's computer, as a stand-alone software package, partly on the user's computer and partly on a remote computer or entirely on the remote computer. In the latter scenario, the remote computer may be connected to a user's computer through a local area network (LAN) or a wide area network (WAN), wireless data network e.g., WiFi, Wimax, 802.xx, and cellular network or the connection may be made to an external computer via most third party supported networks (for example, through the Internet utilizing an Internet Service Provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 3:
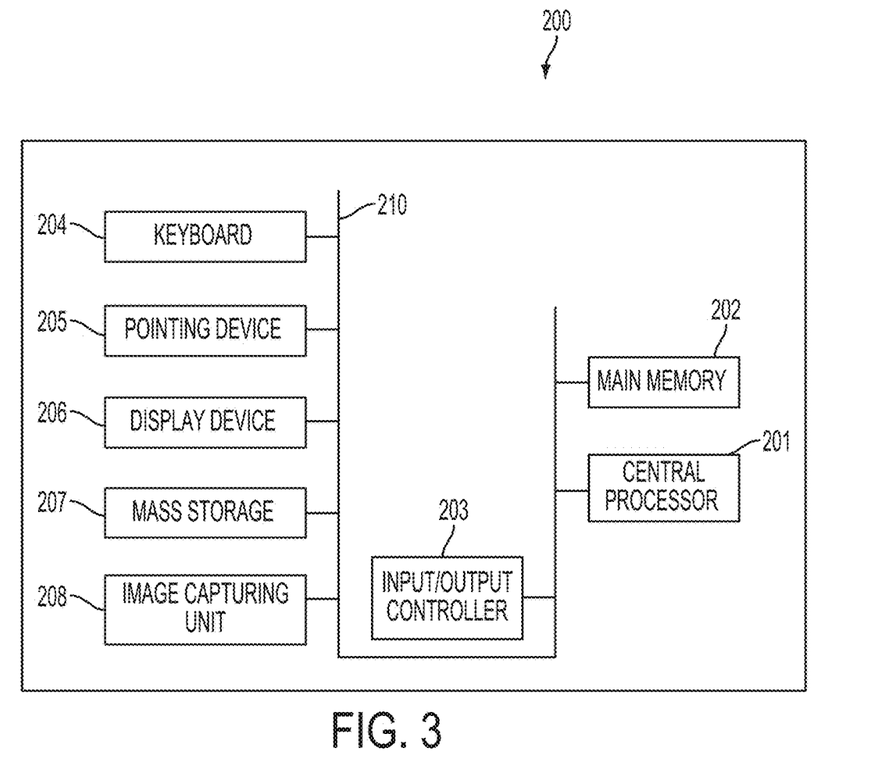
FIG. 3 illustrates a schematic view of a computer system, which can be implemented in accordance with an embodiment.
Figure 4:
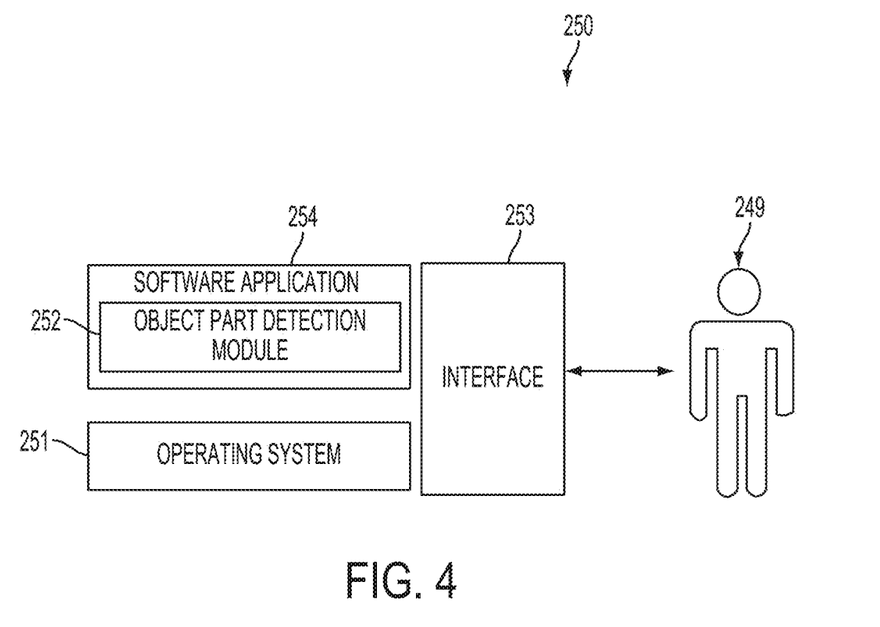
FIG. 4 illustrates a schematic view of a software system including an object part location detection module, an operating system, and a user interface, in accordance with an embodiment.

FIGS. 3-4 are provided as exemplary diagrams of data-processing environments in which embodiments of the present invention may be implemented. It should be appreciated that FIGS. 3-4 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 3, the disclosed embodiments may be implemented in the context of a data-processing system 200 that includes, for example, a central processor 201, a main memory 202, an input/output controller 203, a keyboard 204, an input device 205 (e.g., a pointing device such as a mouse, track ball, and pen device, etc.), a display device 206, a mass storage 207 (e.g., a hard disk), an image capturing unit 208 and a USB (Universal Serial Bus) peripheral connection. As illustrated, the various components of data-processing system 200 can communicate electronically through a system bus 210 or similar architecture. The system bus 210 may be, for example, a subsystem that transfers data between, for example, computer components within data-processing system 200 or to and from other data-processing devices, components, computers, etc.

FIG. 4 illustrates a computer software system 250 for directing the operation of the data-processing system 200 depicted in FIG. 4. The Software application 254 can be stored in the main memory 202 and on mass storage 207. The computer software system 250 generally includes a kernel or operating system 251 and a shell or interface 253. One or more application programs, such as software application 254, may be "loaded" (i.e., transferred from mass storage 207 into the main memory 202) for execution by the data-processing system 200. The data-processing system 200 receives user commands and data through user interface 253; these inputs may then be acted upon by the data-processing system 200 in accordance with instructions from operating system module 252 and/or software application 254.

The following discussion is intended to provide a brief, general description of suitable computing environments in which the system and method may be implemented. Although not required, the disclosed embodiments will be described in the general context of computer-executable instructions such as program modules being executed by a single computer. In most instances, a "module" constitutes a software application.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application, such as a computer program designed to assist in the performance of a specific task such as word processing, accounting, inventory management, etc.

The interface 253, which is preferably a graphical user interface (GUI), also serves to display results, whereupon the user 249 may supply additional inputs or terminate the session. In an embodiment, operating system 251 and interface 253 can be implemented in the context of a "Windows" system. It can be appreciated, of course, that other types of systems are possible. For example, rather than a traditional "Windows" system, other operation systems such as, for example, Linux may also be employed with respect to operating system 251 and interface 253. The software application 254 can include an object part detection module 252 for detecting multiple object part location based on an extended data driven detection. Software application 254, on the other hand, can include instructions such as the various operations described herein with respect to the various components and modules described herein such as, for example, the method 400 depicted in FIG. 6.

FIGS. 3-4 are thus intended as examples and not as architectural limitations of disclosed embodiments. Additionally, such embodiments are not limited to any particular application or computing or data-processing environment. Instead, those skilled in the art will appreciate that the disclosed approach may be advantageously applied to a variety of systems and application software. Moreover, the disclosed embodiments can be embodied on a variety of different computing platforms including Macintosh, UNIX, LINUX, and the like.

Figure 5:
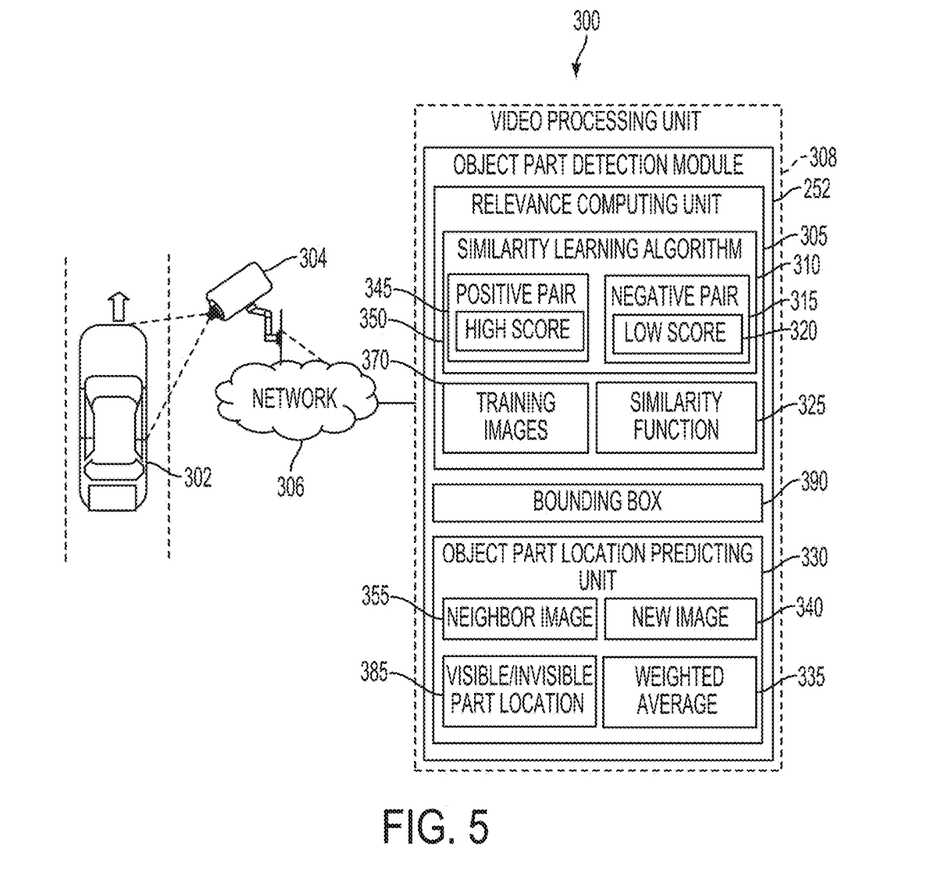
FIG. 5 illustrates a block diagram of an object part location detection system, in accordance with an alternative embodiment.

FIG. 5 illustrates a block diagram of an object part detection system 300, in accordance with the disclosed embodiments. Note that in FIGS. 3-10 identical or similar parts or elements are generally indicated by identical reference numeral. The object part detection system 300 includes the object part detection module 252 for detecting an object part location 385 based on extended data driven detection. Note that the object part location 385 can be, for example, a visible object part location or an invisible object part location, depending upon design consideration. The object part detection system 300 further includes a relevance computing unit 305 and an object part predicting unit 330 for detecting the object part location 385.

The object part detection system 300 generally includes an image capturing unit 304 (e.g., camera) for capturing images of an object such as a vehicle 302 within an effective field of view. The image capturing unit 304 can be operatively connected to an image processing unit 308 via a network 306. The vehicle 302 image captured by the image capturing unit 304 can be processed utilizing the image processing unit 308. Note that the image capturing unit 304 described in greater detail herein is analogous or similar to the image capturing unit 208 of the data-processing system 200, depicted in FIG. 3. The image-capturing unit 304 may include built-in integrated functions such as image processing, data formatting, and data compression functions.

It should be appreciated that although a vehicle 302 is discussed and illustrated herein, the disclosed embodiments can be utilized for detecting and capturing images of other objects, not simply vehicles such as vehicle 302. Thus, the embodiments are not limited to capturing images of vehicles, but are capable of detecting and capturing any number of different types of objects.

Note that the network 306 may employ any network topology, transmission medium, or network protocol. The network 306 may include connections such as wire, wireless communication links, or fiber optic cables. Network 306 can also be an Internet representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational, and other computer systems that route data and messages.

Note that the embodiments discussed herein generally relate to the detection of vehicle parts 385. It can be appreciated, however, that such embodiments can be implemented for detecting parts within images of many other classes of objects e.g., a person, parts of bicycles, vehicles, or structures. The discussion of vehicle part, as utilized herein, is presented for general illustrative purposes only.

The relevance computing unit 305 associated with the object part detection module 252 defines a specific relevance value between configurations of parts with respect to a set of training images 370 annotated with a set of part bounding boxes 390. The relevance computing unit 305 applies a similarity learning algorithm 310 to obtain a similarity function 325 that respects the similarity between the part configurations. In general, similarity learning is one type of a supervised machine learning task in artificial intelligence. It is closely related to regression and classification, but the goal is to learn from examples a function that measure how similar or related two objects are. The similarity learning algorithm 310 receives a set of positive pair 345 having similar part configuration and a negative pair 315 having different configuration and returns the similarity function 325.

The similarity function 325 is a real-valued function that quantifies the similarity between two objects. The similarity function 325 tends to assign a high score 350 to new positive pairs 345 and a low score 320 to the negative pairs 315. The object part location predicting unit 330 measures a similarity with respect to a new image 340 and the set of training images 370 utilizing the learned similarity function 325 in order to obtain a neighbor image 355. The object part location predicting unit 330 predicts a visible and/or non-visible part location with respect to the image 340 based on the neighbor image 355. The object part detection module 252 can be executed as a single query, independent of the number of parts by taking account global consistency between the parts.

Figure 6:
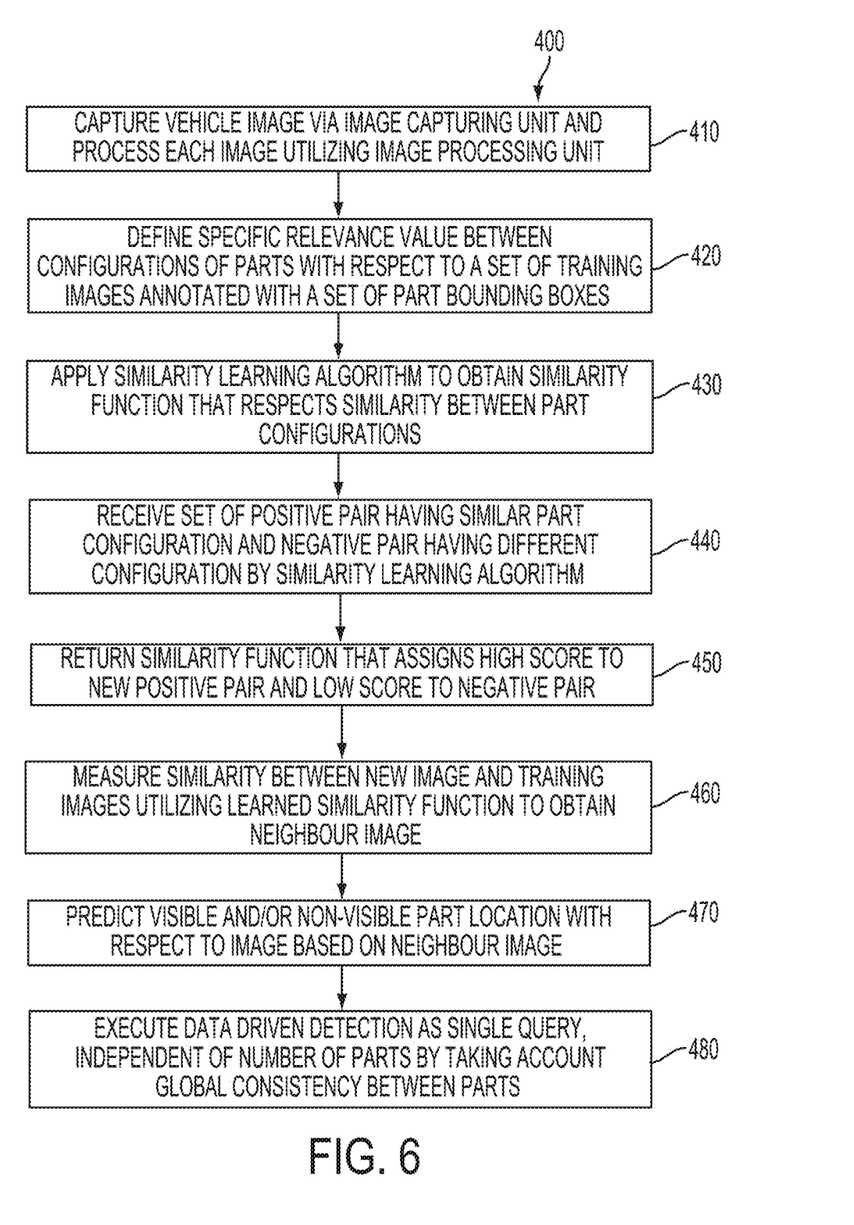
FIG. 6 illustrates a high level flow chart of operations illustrating logical operational steps of a method for detecting multiple object part location utilizing an extended data driven detection, in accordance with an alternative embodiment.

FIG. 6 illustrates a high level flow chart of operations illustrating logical operational steps of method 400 for detecting multiple object part location 385 utilizing the extended data driven detection, in accordance with the disclosed embodiments. It can be appreciated that the logical operational steps shown in FIG. 6 can be implemented or provided via, for example, a module such as module 252 shown in FIG. 4 and can be processed via a processor such as, for example, the processor 201 shown in FIG. 3. The image 340 and 370 with respect to the object can be captured by the image capturing unit 304 and can be processed utilizing the image processing unit 308, as indicated at block 410.

The specific relevance value between configurations of parts with respect to the set of training images 370 annotated with the set of part bounding boxes 390 can be defined, as shown at block 420. The similarity learning algorithm 310 can be applied to obtain the similarity function 325 that respects the similarity between the part configurations, as indicated at block 430. The similarity learning algorithm 310 receives the set of positive pair 345 having similar part configuration and the negative pair 315 having different configuration and returns the similarity function 325 that tends to assign the high score 350 to new positive pairs 345 and low scores 320 to the negative pairs 315, as depicted at blocks 440 and 450.

For example, consider a training set $T=\{(x_i, P_i)\}$, $i=1\ldots N$, of images $x_i$ annotated with a set of part bounding boxes $P_i=\{b_i^1, \ldots, b_i^P\}$, assuming a fixed number P of parts. Assume each $b_p$ represents a rectangle given by the four (top, bottom, left, right) coordinates, but it can also take an empty value meaning that the p-th part is not visible in the image. For future convenience, define $V_i$ to be a set of indices corresponding to the visible parts in image i. As a reminder, the bounding box discussed herein is compatible with other paradigms for annotating the parts such as polygons, pixel masks, graphs, etc., and any reference to rectangles herein is for illustrative purposes only.

For example, consider that two images $x_i$, $x_j$ from the training set have similar or dissimilar configurations, which can be indicated by a relevance value $r_{ij} \in \{0,1\}$ (1=positive, 0=negative). If different parts are visible in images, then the relevance value is zero as shown below in equation (1):

$$(\text{i.e. } V_i \neq V_j) \Rightarrow r_{ij}=0 \tag{1}$$

If similar parts are visible ($V_i=V_j$), then a part-by-part overlap score can be computed. For part p, this is a function $\Psi(b_i^p, b_j^p)$ that measures the overlap between $b_i^p$ and $b_j^p$, such as the area intersection-to-union ratio. If for all the parts is greater than a threshold, then the relevance value is one as shown below in equation (2):

$$\Psi(b_i^p, b_j^p) > \theta \Rightarrow r_{ij}=1 \tag{2}$$

Otherwise the relevance value is zero $r_{ij}=0$. Here, $\theta$ represents a threshold which depends on the constraints of the particular application. The two configurations are similar if the bounding boxes of all visible parts are similar and agree in location. This criterion is sufficient to build triplets of the form $(x_i, x_j, x_k)$ such that $r_{ij}=1$ and $r_{ik}=0$, which are necessary for an SGD similarity learning algorithm.

The object part location 385 from the neighbouring image 355 can be predicted by measuring the similarity with respect to the set of training images 370 utilizing the learned similarity function 325, as depicted at block 460. A similarity between the new image 340 and the training images 370 can be measured utilizing the learned similarity function 325 to obtain the neighbour image 355. The visible and/or non-visible part location 385 with respect to the image 340 can be predicted based on the neighbor image 355, as indicated at block 470. The data driven detection can be executed as a single query, independent of number of parts by taking account global consistence between parts, as indicated at block 480.

For example, consider a new image, the similarity between x and all $x_i$ can be computed (utilizing the learned similarity function), and the nearest neighbors can be determined. The locations (and visibilities) of its parts can be outputted in case of single neighbor and their parts can be combined in case of multiple neighbors. For each part p: if the majority of neighbors with respect to the part is not visible, then the output is an empty value. Otherwise, a weighted average can be computed for the visible parts. To predict the bounding box b' for the new image x', a weighted average of the previous $b_{\pi(1)}, \ldots, b_{\pi(K)}$ can be employed as shown below in equation (3):

$$b'(x'; T) = \sum_{k=1}^{K} w_i b_{\pi(k)} \qquad (3)$$

where $w_i$ represents a function of $k(x', x_{\pi(k)})$.

Figure 7:
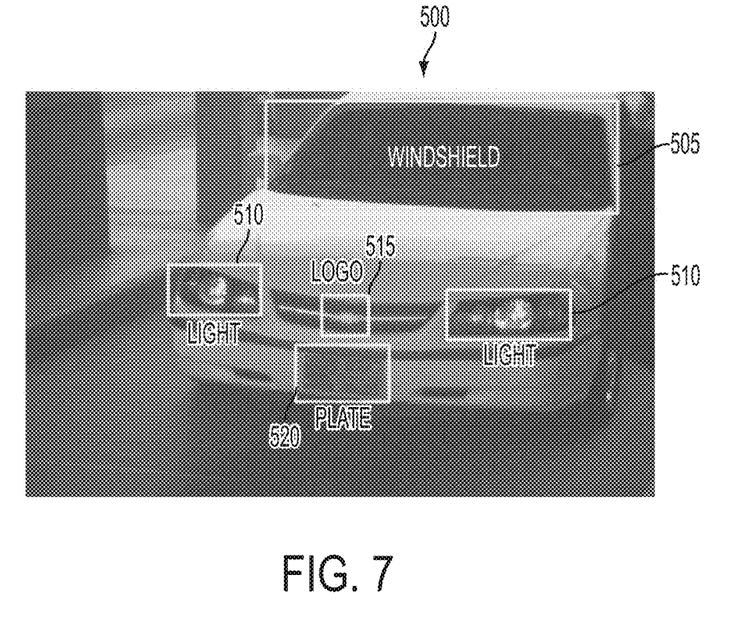
FIG. 7 illustrates an image of vehicle parts detected utilizing the object part detection system, in accordance with an alternative embodiment.

FIG. 7 illustrates an image 500 depicting vehicle parts detected utilizing the object part detection system 300, in accordance with the disclosed embodiments. The object detection system 300 detects the vehicle parts such as, for example, a windshield 505, lights 510, logo 515, and plate 520 to perform vehicle classification in vehicle parks, bridges, etc. The system 300 detects the logo 515 for classifying the vehicle image 500 according to the make and model, and may be other elements with characteristic shapes such as lights 510. Also, in ongoing transportation activities, such as license plate recognition, the license plate region 520 can be detected. Likewise, for high-occupancy lanes, detecting the windshield 505 is the first step to count the number of passengers.

Figure 8:
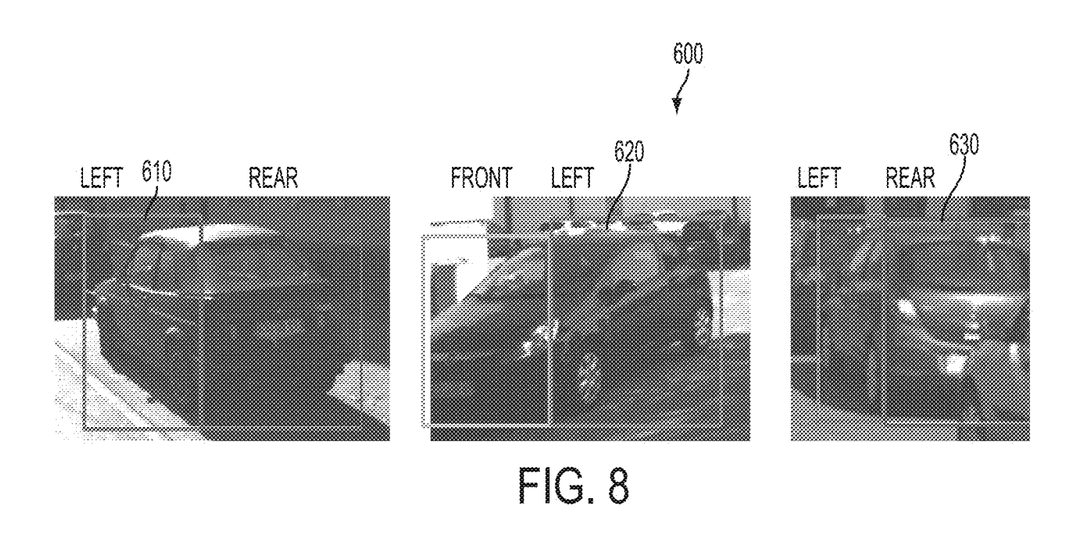
FIG. 8 illustrates an image of vehicles having a set of bounding boxes, in accordance with an alternative embodiment.

FIG. 8 illustrates an image 600 of the vehicles having a set of bounding boxes 610, 620, and 630, in accordance with the disclosed embodiments. FIG. 8 depicts a vehicle pose estimation task. The input to the system 300 is the image of the vehicle 600, and the output is the set of bounding boxes 610, 620, and 630 of the visible vehicle faces: front, rear, left, right (thus, P=4). For example, 5,647 annotated images are used for training and 1,000 for testing. Images can be described with Fisher vectors. To detect the faces of the vehicle 600, the relevance values $r_{ij}$ can be computed as explained above using θ=0.5. The similarity learning, which provides a similarity function k(x,y) can be applied for each test image to recover the neighbors from the training set. From the neighbors, the part locations (and visibilities) can be predicted as explained above.

Figure 9:
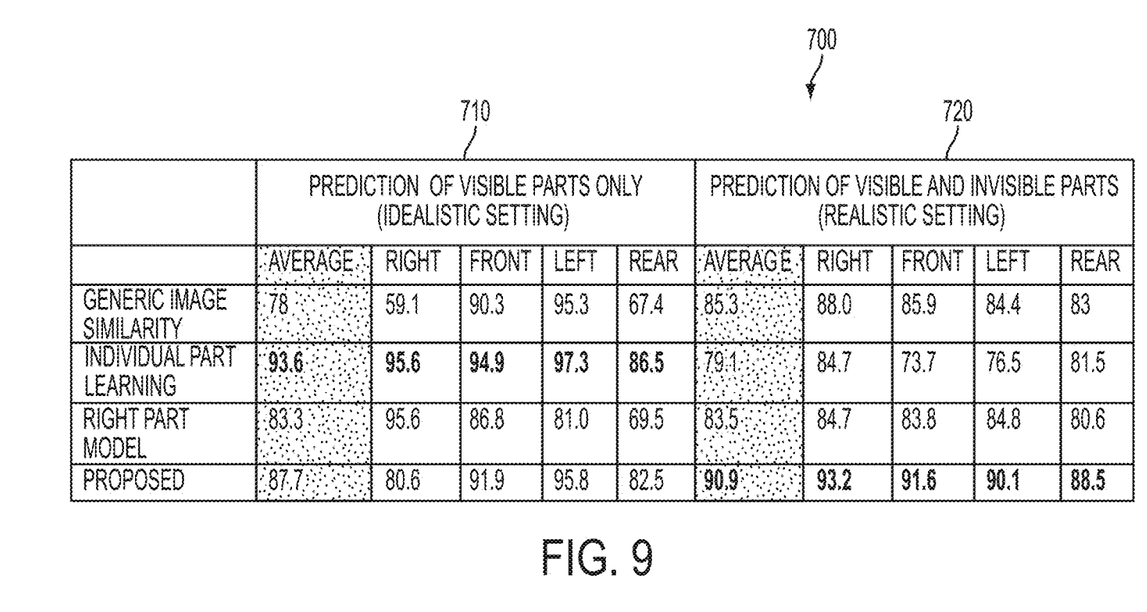
FIG. 9 illustrates a table showing results of the object part detection, in accordance with an alternative embodiment.

FIG. 9 illustrates a table 700 showing results of the object part detection, in accordance with the disclosed embodiments. The percentage of correct parts (PCP) which is a measure commonly used in pose estimation approaches can be counted for evaluation. The number of parts detected correctly can be counted individually, taking into account that a part is correct if a predicted rectangle overlaps with the ground-truth rectangle more than 50%, when it is visible and invisible. Otherwise, an error can be counted. The results ignoring the prediction errors of invisible parts are shown in table 700.

First, an idealistic setting 710 where the invisible parts are ignored can be considered, which obtains the best results with the individual part learning baseline (i.e., learning similarities for each individual part). This indicates that the prior art object detection approach is better when the part is visible in the image and does not take into account other parts. The evaluation of detection taking all the parts into account (i.e., visible and invisible) is illustrated via a realistic setting 720. The object detection method 500 in some embodiments can obtain 90.9% PCP in average and outperforms all other baselines by a margin of +5.6% with respect to the best baseline (no similarity learning, 85.3%).

When evaluated part-by-part, the method 500 also performs the best for each part. In contrast, learning the parts individually yields subpar results (79.1%), which attribute to the fact that the parts are learned independently without taking into account their relations and the visibility value. This reinforces the need for learning a joint model of parts. Note that another disadvantage of the individual parts model is that it is estimated to be P times slower both at training and test time. At training time, it requires learning P similarity functions. At test time, these P similarities functions have to be computed (one for each similarity).

Figure 10:
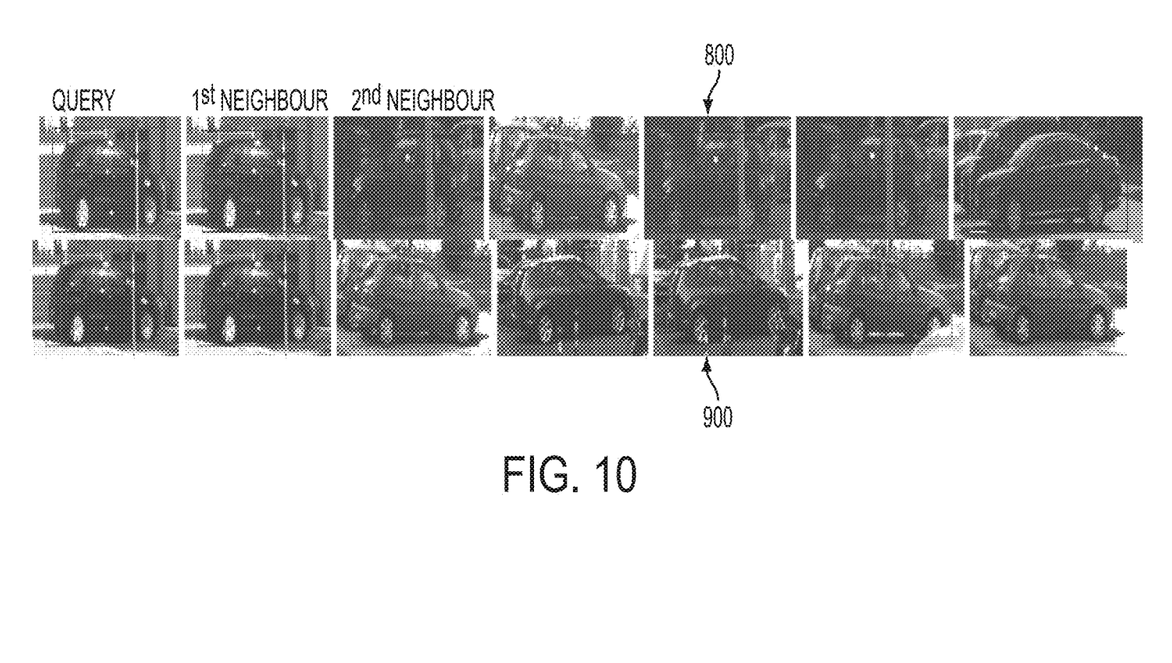
FIG. 10 illustrates a visual representation comparing the object part detection with prior art object detection method, in accordance with an alternative embodiment.

FIG. 10 illustrates a visual result comparing images 800 and 900 detected using the object part detection method 500 and prior art object detection method, in accordance with the disclosed embodiments. A query image and the nearest neighbors in the images 800 retrieved using the prior art object detection method without learning a similarity vehicles are similar in appearance, but not in pose (the vehicle in the query is right-facing and many neighbors are left-facing). In contrast, the neighbors are right-facing for the same query and have similar pose compared to the query in the image 900 detected using the object part detection method 500. The system 300 can be employed for detecting multiple bounding boxes 390 that are not independent and parts that are not visible. The system 300 obtains significantly higher accuracy and can be employed for images annotated with multiple bounding boxes 390 that are not independent.

Based on the foregoing, it can be appreciated that a number of embodiments, preferred and alternative, are disclosed herein. For example, in one embodiment, a method can be implemented for detecting an object part location. Such a method can include, for example, the steps or logical operations of defining a relevance value between a configuration of one or more parts and a set of training images annotated via an annotating object; applying a similarity learning algorithm with respect to the parts to obtain a learned similarity function based on the relevance value; and measuring a similarity between a new image and the set of training images utilizing the learned similarity function in order to obtain a neighbour image and predict a visible and/or a non-visible part location with respect to the new image based on the neighbour image.

In another embodiment, steps or logical operations can be implemented for receiving a set of positive pairs having similar part configurations and a negative pair having different part configurations by the similarity learning algorithm; and returning the similarity function to assign a high score to the positive pair and a low score to the negative pair. In still another embodiment, a step or logical operation can be provided for capturing the training images and the new image with respect to the object by an image-capturing unit and processing the image utilizing an image-processing unit.

In yet another embodiment, a step or logical operation can be implemented for annotating object with respect to the training images and the new image comprises a rectangular shape having at least four coordinates. In another embodiment, a step or logical operation can be provided for annotating object comprises an empty value with respect to the invisible object part location.

In still another embodiment, steps or logical operations can be implemented for defining a set of indices corresponding to the visible part in the training images and thereafter compute the relevance value between the training images; computing a part-by-part overlap score by measuring an overlap between the similar parts; and assigning the relevance value to one if the part-by-part overlap score is greater than a threshold otherwise assign zero. In another embodiment, the threshold may depend on constraints with respect to a data driven detection application. In another embodiment, a step or logical operation can be implemented for assigning the relevance value to zero if the different parts are visible in the training images.

In another embodiment, steps or logical operations can be implemented for outputting the object part location with respect to the new image for a single neighbor; and combining the object part location in case of a plurality of neighbors. In another embodiment, steps or logical operations can be implemented for computing a weighted average for the visible part with respect to the plurality of neighbors; and returning an empty value with respect to the plurality of neighbors having the invisible part.

In another embodiment, a system for detecting an object part location can be implemented. Such a system can include a processor; and a computer-usable medium embodying computer program code, the computer-usable medium capable of communicating with the processor. The computer program code can include instructions executable by the processor and configured, for example, for: defining a relevance value between a configuration of a plurality of parts and a set of training images annotated via an annotating object; applying a similarity learning algorithm with respect to the parts to obtain a learned similarity function based on the relevance value; and measuring a similarity between a new image and the set of training images utilizing the learned similarity function in order to obtain a neighbour image and predict a visible and/or a non-visible part location with respect to the new image based on the neighbour image.

In another embodiment, such instructions can be further configured for receiving a set of positive pairs having similar part configurations and a negative pair having different part configurations by the similarity learning algorithm; and returning the similarity function to assign a high score to the positive pair and a low score to the negative pair. In still another embodiment, such instructions can be further configured for capturing the training images and the new image with respect to the object by an image-capturing unit and processing the image utilizing an image-processing unit. In another embodiment, such instructions can be further configured for annotating the object with respect to the training images and the new image comprises a rectangular shape having at least four coordinates. In another embodiment, annotating the object can involve the use of an empty value with respect to the invisible object part location.

In another embodiment, a processor-readable medium storing code representing instructions to cause a process for detecting an object part location can be implemented. Such code can include code to, for example: define a relevance value between a configuration of a plurality of parts and a set of training images annotated via an annotating object; apply a similarity learning algorithm with respect to the parts to obtain a learned similarity function based on the relevance value; and measure a similarity between a new image and the set of training images utilizing the learned similarity function in order to obtain a neighbour image and predict a visible and/or a non-visible part location with respect to the new image based on the neighbour image.

It will be appreciated that variations of the above-disclosed and other features and functions, or alternatives thereof, may be desirably combined into many other different systems or applications. It will also be appreciated that various presently unforeseen or unanticipated alternatives, modifications; variations or improvements therein may be subsequently made by those skilled in the art, which are also intended to be encompassed by the following claims.

The invention claimed is:

1. A method for detecting an object part location in images captured by at least one camera, said method comprising:
    defining with a relevance computing unit, a specific relevance value between a configuration of a plurality of parts and a set of training images annotated via an annotating object;
    applying a similarity learning algorithm with respect to said plurality of parts to obtain a learned similarity function based on said specific relevance value, wherein said learned similarity function comprises a real-valued function that quantifies a similarity between at least two objects and wherein said similarity learning algorithm respects a similarity between part configurations, wherein a similarity learning of said similarity learning algorithm comprises a supervised machine learning task, and wherein said learned similarity function assigns a high score to positive pairs and a low score to negative pairs;
    measuring a similarity between a new image captured by said at least one camera and said set of training images utilizing said learned similarity function in order to obtain a neighbor image and predict an object part location of a visible object part and a non-visible object part with respect to said new image based on said neighbor image;
    capturing with said at least one camera, said set of training images and said new image with respect to said annotating object;
    processing said set of training images and said new image utilizing an image processor and wherein said predict said object part location of said visible object part and said non-visible object part with respect to said new irnace based on said neighbor image, further comprises a detection of an object part, wherein said detection is executable as a single query that is independent of a number of object parts by taking into account a global consistency between said object parts;
    defining a set of indices corresponding to said visible object part in said training images among said set of training images and thereafter computing said specific relevance value between said training images among said set of training images;
    computing a part-by-part overlap score by measuring an overlap between similar parts; and assigning said specific relevance value to one if said part-by-part overlap score is greater than a threshold otherwise assign zero.

2. The method of claim 1 further comprising:
receiving a set of said positive pairs having similar part configurations and a negative pair having different part configurations by said similarity learning algorithm; and
returning said learned similarity function to assign said high score to said positive pairs and said low score to said negative pair.

3. The method of claim 1 wherein said annotating object with respect to said set of training images and said new image comprises a rectangular shape having at least four coordinates.

4. The method of claim 3 wherein said annotating object comprises an empty value with respect to said object part location of said non-visible object part.

5. The method of claim 1 wherein said threshold depends on constraints with respect to a data driven detection application.

6. The method of claim 1 further comprising assigning said specific relevance value to zero if different parts are visible in said training images among said set of training images.

7. The method of claim 1 further comprising:
outputting said object part location of said visible object part and said non-visible object part with respect to said new image based on said neighbor image for a single neighbor among a plurality of neighbors; and
combining object part locations in a case of said plurality of neighbors.

8. The method of claim 7 further comprising:
computing a weighted average for said visible object part with respect to said plurality of neighbors; and
returning an empty value with respect to said plurality of neighbors having said non-visible object part.

9. A system for detecting an object part location in images captured by at least one camera, said system comprising:
a processor; and
a computer-usable medium embodying computer program code, said computer-usable medium capable of communicating with the processor, said computer program code comprising instructions executable by said processor and configured for:
defining with a relevance computing unit, a specific relevance value between a configuration of a plurality of parts and a set of training images annotated via an annotating object;
applying a similarity learning algorithm with respect to said plurality of parts to obtain a learned similarity function based on said specific relevance value, wherein said learned similarity function comprises a real-valued function that quantifies a similarity between at least two objects and wherein said similarity learning algorithm respects a similarity between part configurations, wherein a similarity learning of said similarity learning algorithm comprises a supervised machine learning task, and wherein said learned similarity function assigns a high score to positive pairs and a low score to negative pairs;
measuring a similarity between a new image captured by said at least one camera and said set of training images utilizing said learned similarity function in order to obtain a neighbor image and predict an object part location of a visible object part and a non-visible object part with respect to said new image based on said neighbor image;
capturing via said at least one camera, said set of training images and said new image with respect to said annotating object;
processing said set of training images and said new image utilizing an image processor and wherein said predict said object part location of said visible object part and said non-visible object part with respect to said new image based on said neighbor image, further comprises a detection of an object part, wherein said detection is executable as a single query that is independent of a number of object parts by taking into account a global consistency between said object parts;
defining a set of indices corresponding to said visible object part in said training images among said set of training images and thereafter computing said specific relevance value between said training images among said set of training images;
computing a part-by-part overlap score by measuring an overlap between similar parts; and
assigning said specific relevance value to one if said part-by-part overlap score is greater than a threshold otherwise assign zero.

10. The system of claim 9 wherein said instructions are further configured for:
receiving a set of said positive pairs having similar part configurations and a negative pair having different part configurations by said similarity learning algorithm; and
returning said learned similarity function to assign said high score to said positive pair and said low score to said negative pair among said negative pairs.

11. The system of claim 10 wherein said annotating object with respect to said training images among said set of training images and said new image comprises a rectangular shape having at least four coordinates.

12. The system of claim 11 wherein said annotating object comprises an empty value with respect to a location of said non-visible object part.

13. A non-transitory processor-readable medium having stored thereon processor executable instructions configured to cause a processor to perform operations for detecting an object part location in images captured by at least one camera, comprising:
defining with a relevance computing unit a specific relevance value between a configuration of a plurality of parts and a set of training images annotated via an annotating object;
applying a similarity learning algorithm with respect to said plurality of parts to obtain a learned similarity function based on said specific relevance value, wherein said learned similarity function comprises a real-valued function that quantifies a similarity between at least two objects and wherein said similarity learning algorithm respects a similarity between part configurations, wherein a similarity learning of said similarity learning algorithm comprises a supervised machine learning task, and wherein said learned similarity function assigns a high score to positive pairs and a low score to negative pairs;
measuring a similarity between a new image captured by said at least one camera and said set of training images utilizing said learned similarity function in order to obtain a neighbor image and predict a location of a visible object part and a non-visible object part with respect to said new image based on said neighbor image;

capture via said at least one camera said set of training images and said new image with respect to said annotating object;

process said set of training images and said new image utilizing an image processor and wherein said predict said object part location of said visible object part and said non-visible object part with respect to said new image based on said neighbor image, further comprises a detection of an object part, wherein said detection is executable as a single query that is independent of a number of object parts by taking into account a global consistency between said object parts;

define a set of indices corresponding to said visible object part in said training images among said set of training images and thereafter computing said specific relevance value between said training images among said set of training images;

compute a part-by-part overlap score by measuring an overlap between similar parts; and assign said specific relevance value to one if said part-by-part overlap score is greater than a threshold otherwise assign zero.

14. The processor-readable medium of claim 13 wherein said processor executable instructions are configured to cause a processor to perform operations to:

receive a set of said positive pairs having similar part configurations and a negative pair having different part configurations by said similarity learning algorithm; and return said similarity function to assign said high score to said positive pairs and said low score to said negative pair among said negative pairs.

15. The processor-readable medium of claim 13 wherein said annotating object comprises an empty value with respect to a location of said non-visible object part.

* * * * *